Figure 1:
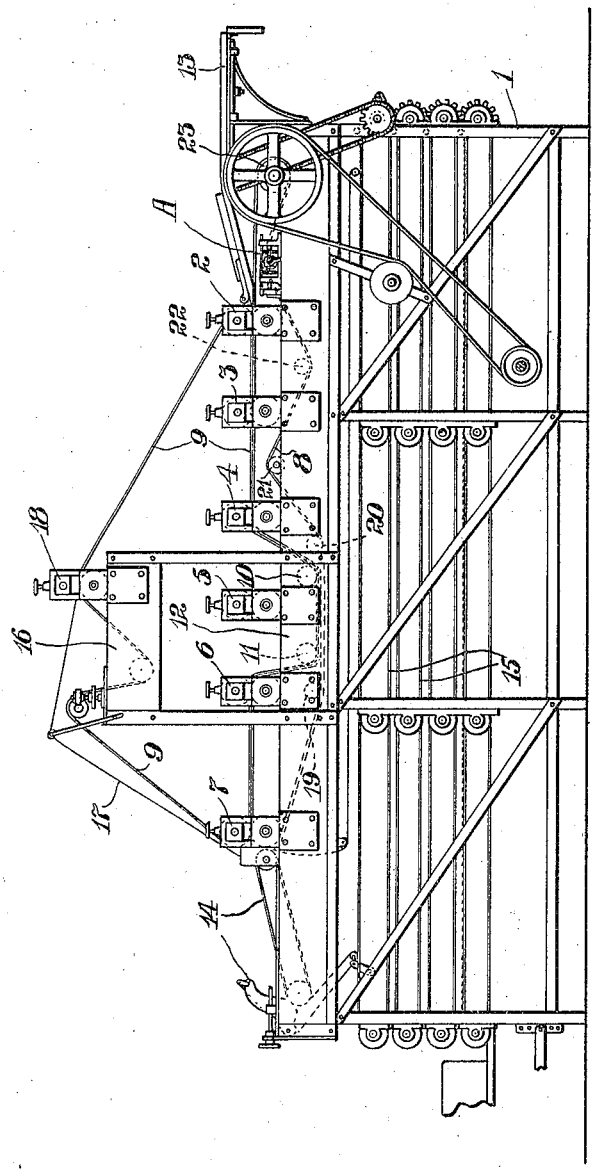

W. H. SMITH.
BELT STRAIGHTENER.
APPLICATION FILED JUNE 30, 1913.

1,178,602.

Patented Apr. 11, 1916.
3 SHEETS—SHEET 1.

Attest:

Inventor:
William Henry Smith
by
his Atty

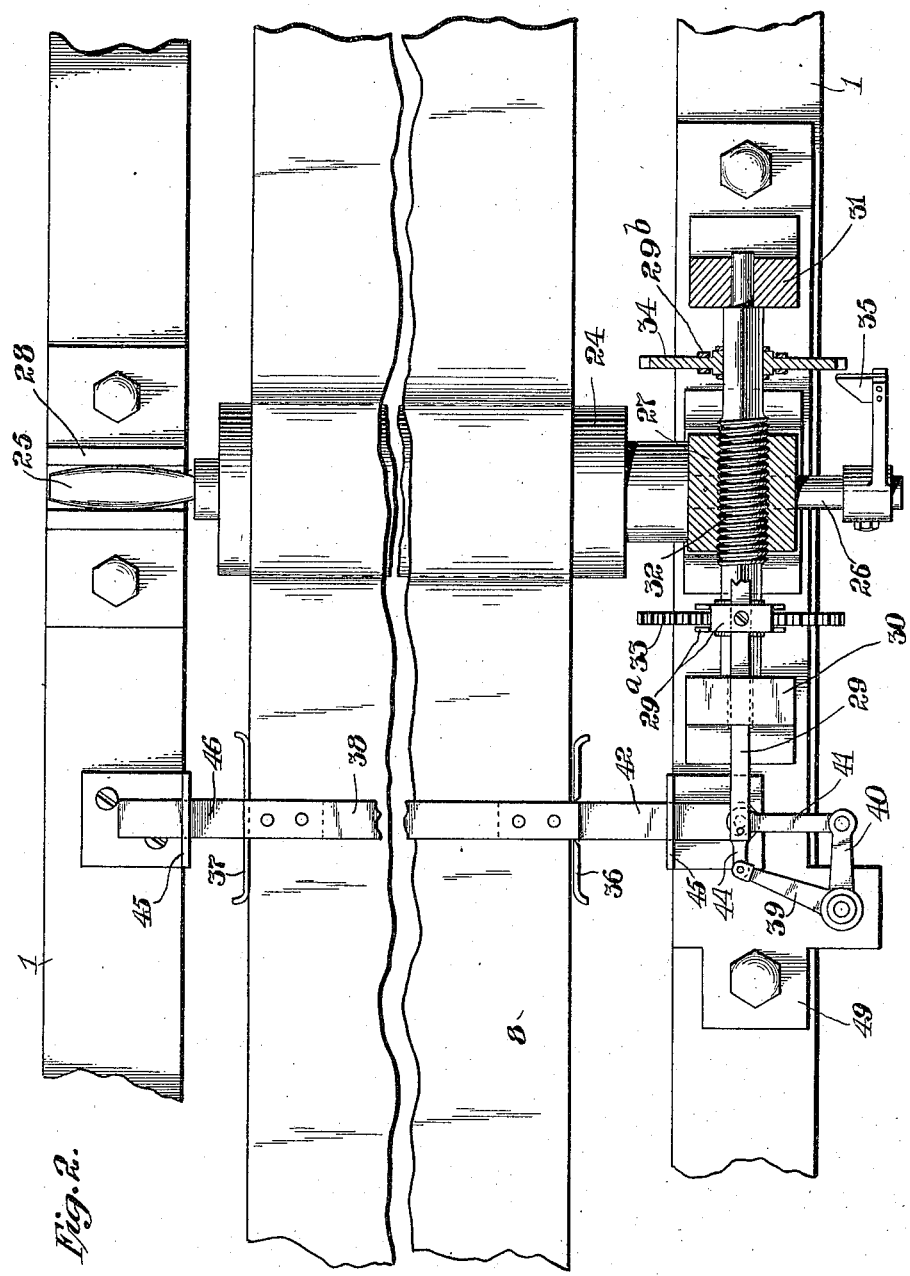

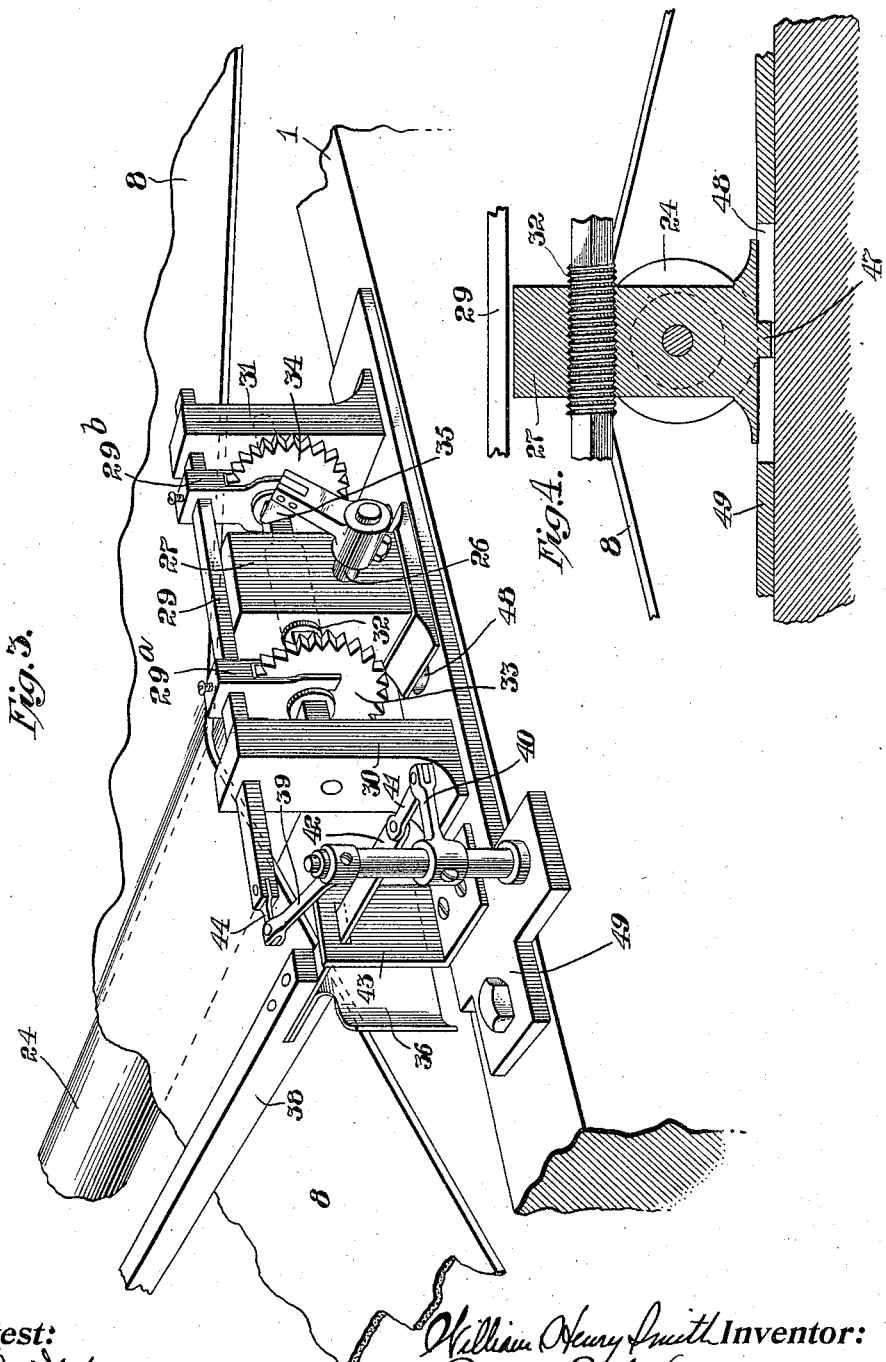

UNITED STATES PATENT OFFICE.

WILLIAM HENRY SMITH, OF NEW ROCHELLE, NEW YORK, ASSIGNOR TO AMERICAN BANK NOTE COMPANY, A CORPORATION OF NEW YORK.

BELT-STRAIGHTENER.

1,178,602.　　　　Specification of Letters Patent.　　Patented Apr. 11, 1916.

Application filed June 30, 1913. Serial No. 776,494.

*To all whom it may concern:*

Be it known that I, WILLIAM HENRY SMITH, a subject of the King of the United Kingdom of Great Britain and Ireland, residing at New Rochelle, in the county of Westchester and State of New York, have invented certain new and useful Improvements in Belt-Straighteners, of which the following is a specification, reference being had therein to the accompanying drawings, which form a part thereof.

My invention relates to belt straighteners, and is applicable more particularly to use in connection with the damping belts upon paper damping machines.

The main object of the invention is to provide an automatically acting straightening device, the actuation of which is controlled through a loss of alinement of the belt itself, the device being rendered operative by a lateral shifting of the belt in either direction.

A further object is to provide a continuously acting device of this character, the operative moment of which will be determined by the extent of lateral movement of the belt.

A still further object is to provide a device of this character wherein the belt actuated controlling means will be under a load so light as to prevent the crinking of the belt through the resistance encountered thereby from the controlling guides. And a still further object is to provide a device of this character which will keep a belt perfectly flat, and automatically compensate for those fluctuations in the alinement of the belt incidental to the operation thereof, thus insuring the preservation of the alinement at the point of initial operative run of the belt.

The invention consists primarily in a belt straightener comprising an oscillatory guide roller, normally inoperative means adjacent, and in operative relation, to one end of said guide roller whereby an oscillatory movement may be imparted thereto, laterally movable guides adapted to be engaged by the belt, and connections between said guides and said normally inoperative means, whereby said last named means is made operative through a lateral movement of the belt; and in such other novel features of construction and combination of parts, as are hereinafter set forth and described, and more particularly pointed out in the claims hereto appended.

Referring to the drawings:—Figure 1 is a side elevation of a damping machine embodying therein my belt straightening device; Fig. 2 is a plan view of the device, partly broken away to disclose the construction of the guide roller actuating mechanism; Fig. 3 is a perspective side view of my mechanism on a larger scale than shown in Fig. 1; and Fig. 4 is a vertical section of the guide roller and a portion of its actuating mechanism.

Like letters refer to like parts throughout the several views.

In the accompanying drawings, I have shown my invention as applied to a paper damping or wetting machine in connection with which type of machine it has peculiar applicability by reason of the necessity for keeping the damping strip or belt perfectly flat and avoiding the formation of any creases or wrinkles therein. In this type of machine there are employed two stretches of strips or belts, which during a portion of the run thereof come together and run in parallel courses, between presser and guide rollers and through a wetting or damping bath, the sheets of paper being conveyed between these two stretches through said bath. Inasmuch as in damping or wetting the paper, it is necessary to secure a uniform distribution of the damping or wetting fluid, it is essential that no wrinkles or creases shall be developed in said strips or belts. In the type of machine illustrated in the accompanying drawings, I have found a tendency of the lower belt to lose its alinement and wrinkle, while in the upper belt there is little or no such tendency. Hence I have applied my belt straightening device in this particular type of machine to only the lower strip or belt, and in practice I have found this to prove highly satisfactory in enabling a continued run of the machine and a uniform effect or result in the damping of the paper sheets passed therethrough. It is not my intention, however, to limit the invention to the particular type of machine shown in the accompanying drawings, nor to its use upon one belt in this type of machine, it being apparent that its use may be extended to other types of machines, or to all of the belts used in a machine, if desired.

In the embodiment of the invention shown in the drawings, 1 indicates the main frame of the machine, embodying a sequence of presser rollers 2, 3, 4, 5, 6 and 7, between which the absorbent damping or wetting belts 8 and 9 are adapted to be passed for the purpose of forcing the damping fluid into the fibers of the paper. The presser rollers indicated at 5 are capable of use when the character of paper used is not such as to necessitate its passage through water while contained between the two belts, although with those papers which are the least absorbent, such as "bond" and "parchment", it is preferable to pass the strips about the guide rollers indicated at 10 and 11 within the tank 12.

At one end of the machine is a feed shelf 13, while at the other end thereof is a delivery mechanism 14, adapted to receive the dampened sheets.

Below the machine are a sequence of conveyer belts adapted to expose the sheets to the air after damping or wetting, these belts being used with some grades of paper and not with other grades. The mellowing belts are indicated by the reference numeral 15.

Above the machine is the tank 16 through which the strip or belt 9 passes after leaving the presser rollers 7, the tapes 17 passing across said tank and directly to the presser rollers 18 carried thereby.

Beneath the feed shelf 13 and upon the main driving shaft of the machine, I mount a driving roller 23, about which the strip or belt 8 passes.

The course of the strip or belt 8 is about the drive roller 23, and one of the presser rollers 7, and between the intermediate presser rollers, the return reach thereof being about the guide rollers 19, 20, 21 and 22, in and upon the tank 12, and about the guide roller forming a part of my straightening device which will be hereinafter referred to more particularly. The course of the strip or belt 9 is about the rollers 2 and 7, between the intermediate presser rollers, while parallel and in contact with the belt 8, through the tank 16 and presser rollers 17 thereof, to the starting point.

To keep the strip or belt 8 straight, and in proper alinement while it is about the driving roller 23, so as to have it perfectly straight as it passes between the presser rollers 2, I mount my straightening device between the guide roller 22 and said driving roller 23 in the manner indicated to the right of Fig. 1, the entire straightening device in this figure being indicated by the reference letter A. This straightening device comprises a guide roller 24, (see Figs. 2, 3 and 4) intermediate the guide roller 22 and the driving roller 23, said roller 24 being provided with bearings so arranged as to permit its oscillation to vary the direction of lineal traverse of the strip or belt 8. One arbor 25 of said roller 24 is loosely mounted so as to permit the other end of said roller to swing freely, while the other arbor 26 is mounted in a movable block or carrier 27, through which movement is imparted to said roller with the arbor 25 as an axis. Preferably, the arbor 25 is loosely mounted in its bearing 28, sufficient play being afforded to permit the slight oscillatory movement of said arbor incidental to the actuation of the device, although if desired other forms of bearing may be used which will have the same effect.

To accomplish the oscillatory movement of the guide roller 24, I provide means which, when the strip or belt is running true, or under normal conditions, will be inoperative, means under the control of the strip or belt itself being provided whereby any loss of alinement will be corrected through the temporary actuation of said normally inoperative means. This actuating means embodies therein a structure whereby, after each oscillation of the guide roller 24 to vary the lineal course of the strip or belt, said roller will be restored to its former position as the belt comes into alinement. In the accompanying drawings, this mechanism comprises a slidable frame 29 capable of movement longitudinally of the machine and mounted in brackets 30 and 31, carried by the frame 1. Mounted in said brackets is a feed screw 32, the threads of which mesh with corresponding threads in the block or carrier 27 as shown in Figs. 2 and 4.

I provide means carried by and slidable with the frame 29 for imparting rotary movement to the feed screw 32, which means comprises the star wheels 33 and 34 disposed upon opposite sides of the block 27 in position where they are adapted to be brought into position to be engaged by the tappet or rotary pawl 35, mounted upon the arbor 26 of the guide roller 24, for oscillating said roller. In the accompanying drawings, the ends of the feed screw 32 are shown as squared to facilitate the mounting of these star wheels 33 and 34, although other means for mounting them upon the feed screw 32 may be used if desired. I have also shown the forks 29$^a$ and 29$^b$ of the frame 29, between which the wheels 33 and 34 are mounted, as adjustable upon the top bar of the frame 29, which construction is solely for the purpose of facilitating the assembling of the device and establishing the proper relation of the star wheels 33 and 34 to the tappet or pawl 35. The top bar of the frame 29 is slidably mounted in the brackets 30 and 31 so as to permit said wheels 33 and 34 to be shifted to establish the operative relation between either of the star wheels 33 and 34 and said tappet 35. The shifting of the frame 29 is accomplished through suitable guides engaged by the strip or belt 8, so as to cause the shifting of the frame 29 and its star wheels 33 and 34 simultaneously with a loss of alinement of the belt 8 and to a degree determined by the extent of lateral movement of the said belt. There are two such guides 36 and 37, between which the strip or belt 8 runs, said guides being connected by the tie piece 38 so as to move in unison and cause the wheels 33 and 34 and tappet or pawl 35 to be brought into the operative relation in case of a lateral movement of the strip or belt in either direction. The connections between the guides 36 and 37 comprise a bell crank lever 39, one arm 40 of which is connected by the pivotally connected link 41 to an extension 42 on the tie piece 38, said extension passing through a guide bracket 43, and the other arm of which is connected by the pivotally connected link 44 with the top bar of the frame 29. A bracket 45 oppositely disposed as to the bracket 43 serves as a guide for the extension 46 of the tie piece 38. By these connections, the lateral movement of the guides 36 and 37 results in a longitudinal movement of the frame 29, thus shifting the wheels 33 and 34 in a manner to bring one or the other of them within the operative range of the tappet or pawl 35.

The block 27 is slidably mounted upon the top bar of the frame 1, the tongue 47 having movement in a slot 48 on the base plate 49, supporting the brackets 30, 31 and 43, and the parts appurtenant thereto.

By using a screw of low pitch, and setting the wheels 33 and 34 so that normally they will be just beyond the operative range of the tappet or pawl 35, the slightest shifting of the strip or belt 8 will result in the actuation of the straightening device, thus insuring the correction of any loss of alinement before there has been any possibility of wrinkling or creasing of the belt or strip and with a rapidity which will cause said collection to occur before the strip or belt will have lost alinement at the driving roller 23.

The operation of the herein described belt straightening device is substantially as follows:—

The paper sheets are fed from the shelf 13 directly between the strips or belts 8 and 9 as they converge in passing between the presser rollers 2, being carried between said strips through the succeeding presser rollers to the presser rollers 7, at which point they are delivered to the delivery mechanism 14. After delivery of the sheets, the belt 9 passes upwardly and through the tank 16, back to the upper of the presser rollers 2, and the strip or belt 8 passes downwardly about the guide rollers 19, 20, 21 and 22, over the straightening roller 24 and about the drive roller 23. Assuming that the strip or belt 8 is running in perfect alinement, the straightening roller 24 will be rotated thereby, the tappet or pawl 35 carried thereby rotating freely between the wheels 33 and 34 because of the rectilinear position of the roller 24. If in passing through the tank 13, the belt 8 shifts laterally, it will, in passing from the roller 22 to the roller 24, through its engagement with one or the other of the guide plates 36 and 37, rock the bell crank lever 39 and impart longitudinal movement to the frame 29, thus bringing one or the other of the wheels 33, 34, within the operative range of the tappet or pawl 35. Assuming that the belt is shifted to the right, Fig. 2, the wheel 33 will have been brought within the operative range of the tappet or pawl 35, thus causing a subsequent contact of said ratchet or pawl with said wheel, (upon the upstroke of the former) to turn the feed screw 32 to the left, tilting or swinging the end of the roller 24 in the direction of traverse of the strip or belt. With each rotation of the roller 24 under the conditions above referred to, its angle will be increased, thus maintaining the wheel 33 within the operative range of said tappet or pawl and varying the angular movement of said roller in proportion to the degree or duration of departure of the strip or belt 8 from the proper alinement. As the belt comes again to the proper alinement, it will act on the other guide plate as 37, reverse the movement of the bell crank lever 39 and all of the parts under the control of said guide plates, bringing the wheel 34 within the operative range of the tappet or pawl 35 and throwing the wheel 33 without such range. Under these conditions, the ratchet or pawl will, upon its down stroke, act upon the wheel 34, and by reason of said wheel being diametrically opposite to the wheel 33, reverse the direction of rotation of the screw 32 and restore the roller to its former rectilinear or normal position, the centering of the guide plates 36 and 37 finally again bringing both wheels 33 and 34 without the operative range of the ratchet or pawl 35. The guide roller 24 being on a different plane than the roller 22, and the driving roller 23, about which the strip or belt passes, the pressure of said strip or belt 8 upon said roller 24 will be sufficiently great to prevent slippage.

It will be observed that by a construction such as I have herein shown and described, the straightening device becomes operative immediately upon the beginning of the departure of the belt from its true alinement, and will continue so long as there is any tendency on the part of the belt to travel out of true. Hence, under no circumstances can the belt depart materially from its true alinement, although a continued tendency of the belt to so depart will merely result in a continued operation of the straightening device and a gradual and continued straightening of the belt.

The device works entirely automatically and in practice has been found to work in a highly satisfactory manner. By placing the straightening device intermediate the guide roller 22 and the driving roller 23, the alinement is preserved adjacent to the point of initial run of the belt, so that creases and wrinkles are avoided at the feeding point of the machine, the formation of such being impossible as the strips or belts 8 and 9 pass between the succeeding presser rollers. The keeping of the belt 8 perfectly straight and flat insures the application of the damping fluid uniformly throughout the entire area of the paper being run through the machine, thus increasing the efficiency of the machine and permitting the paper to be delivered flat and smooth.

It is not my intention to limit myself to the precise details of construction shown in the accompanying drawings, it being apparent that such may be varied without departing from the spirit and scope of the invention.

Having described my invention, what I claim as new and desire to have protected by Letters Patent, is:—

1. A belt straightener embodying therein an oscillatory guide roller, a slidable bearing block for one end thereof, a feed screw adapted to actuate said block, toothed wheels slidably mounted on said screw, a rotary tappet or pawl actuated by said guide roller and located intermediate, and adapted to operatively engage either of, said wheels, but normally disengaged therefrom, means adapted to be engaged and actuated by the strip or belt, a slidable frame adapted to simultaneously and similarly move said wheels, means whereby said wheels may be adjusted in said frame to determine the time when said tappet or pawl will become operative as to said wheels, and connections between said first-named means and said frame whereby said wheels are alternately brought into the operative relation to said tappet or pawl.

2. A belt straightener embodying therein an oscillatory guide roller, a slidable bearing block for one end thereof, a feed screw, adapted to actuate said block, toothed wheels slidably mounted on said screw, a rotary tappet or pawl actuated by said guide roller and located intermediate, and adapted to operatively engage either of, said wheels, but normally disengaged therefrom, guide plates adapted to be engaged by opposite edges of the strip or belt, a tie piece connecting said plates whereby they are caused to have uniform movement, a slidable frame adapted to simultaneously and similarly move said wheels, a bell crank lever adjacent said tie piece, and pivotally connected links between the opposite arms of said lever and said tie piece and said frame respectively, whereby movement of said guide plates by the strip or belt will bring said wheels alternately into the operative relation to said tappet or pawl.

3. A belt straightener embodying therein an oscillatory guide roller, non-oscillatory guide rollers upon opposite sides of, and upon a different horizontal plane from, said oscillatory guide roller, whereby the strip or belt is tensioned upon the latter, presser rollers adjacent said oscillatory roller, one of said non-oscillatory guide rollers being between said oscillatory guide roller and said presser rollers, normally inoperative means adjacent, and in operative relation, to one end of said guide roller, whereby an oscillatory movement may be imparted thereto, laterally movable guides adapted to be engaged by the strip or belt, and connections between said guides and said normally inoperative means whereby said last named means is made operative through a lateral movement of the belt.

4. A belt straightener embodying therein a driving roller, a guide roller on substantially the same horizontal plane therewith, a fixed bearing on one side of the machine, a slidable bearing opposite thereto, said bearings being intermediate said driving and said guide rollers, a guide roller occupying a plane above said driving and said first named guide roller and having one arbor loosely mounted in said fixed bearing and its other arbor mounted in said slidable bearing, fixed brackets at each side of said slidable bearing, a feed screw having its opposite ends mounted in said brackets, said feed screw operatively engaging coöperating threads in said slidable bearing, a rod slidably mounted in said brackets, forks carried by said rod on opposite sides of said slidable bearing, star wheels slidably mounted upon said feed screw and seated within said forks respectively, a tappet or pawl carried by said guide roller mounted in said slidable bearing, said tappet or pawl being normally disengaged from but adapted with the movement of said slidable bearing, to operatively engage either of said star wheels, an endless belt passing about said driving roller and over said guide rollers, a tie piece mounted in bearings upon opposite sides of the machine, guide plates mounted thereon and adapted respectively to engage an edge of said belt, a bell crank lever, a link pivotally connected with one arm of said lever and said tie piece, and a link pivotally connected with the other arm of said lever and said rod.

In witness whereof, I have hereunto affixed my signature in the presence of two subscribing witnesses, this 23d day of June, 1913.

WILLIAM HENRY SMITH.

Witnesses:
EUGENE WENING,
CLARICE FRANCK.

Copies of this patent may be obtained for five cents each, by addressing the "Commissioner of Patents, Washington, D. C."